(12) United States Patent
Chen et al.

(10) Patent No.: US 12,421,341 B2
(45) Date of Patent: Sep. 23, 2025

(54) SUSPENSION STABILIZER WITH HIGH YIELD VALUE AND HIGH TRANSPARENCY, AND PREPARATION PROCESS AND USE THEREOF

(71) Applicant: GUANGZHOU DX CHEMICAL CO., LTD, Guangdong (CN)

(72) Inventors: Jie Chen, Guangzhou (CN); Shuliang Rao, Guangzhou (CN)

(73) Assignee: GUANGZHOU DX CHEMICAL CO., LTD, Guangdong (CN)

( * ) Notice: Subject to any disclaimer, the term of this patent is extended or adjusted under 35 U.S.C. 154(b) by 685 days.

(21) Appl. No.: 17/780,332

(22) PCT Filed: Feb. 26, 2021

(86) PCT No.: PCT/CN2021/078016
§ 371 (c)(1),
(2) Date: May 26, 2022

(87) PCT Pub. No.: WO2022/083043
PCT Pub. Date: Apr. 28, 2022

(65) Prior Publication Data
US 2023/0042246 A1    Feb. 9, 2023

(30) Foreign Application Priority Data
Oct. 21, 2020 (CN) .......................... 202011134202.7

(51) Int. Cl.
*C08F 283/06* (2006.01)
(52) U.S. Cl.
CPC .................. *C08F 283/06* (2013.01)
(58) Field of Classification Search
CPC .................................................. C09D 171/00
See application file for complete search history.

(56) References Cited

U.S. PATENT DOCUMENTS

| | | | |
|---|---|---|---|
| 4,771,098 A | 9/1988 | Siol et al. | |
| 2017/0367963 A1* | 12/2017 | Kadir | A61K 8/86 |
| 2020/0268903 A1* | 8/2020 | Lee | A61K 49/0036 |

FOREIGN PATENT DOCUMENTS

| | | |
|---|---|---|
| CN | 101974134 | 2/2011 |
| CN | 103772625 | 5/2014 |
| CN | 103788283 | 5/2014 |
| CN | 104448107 | 3/2015 |
| CN | 107641167 | 1/2018 |
| CN | 112225846 | 1/2021 |
| WO | 2010105767 | 9/2010 |

OTHER PUBLICATIONS

English Machine Translation of CN 103788283 A (Year: None).*
International Search Report issued for International Patent Application No. PCT/CN2021/078016, Date of mailing: May 26, 2021, 6 pages including English translation.
First Office Action issued for Chinese Patent Application No. 202011134202.7, dated Mar. 30, 2021, 13 pages Including English machine translation.
Second Office Action issued for Chinese Patent Application No. 202011134202.7, dated Jun. 22, 2021, 13 pages Including English machine translation.
First Search Report issued for Chinese Patent Application No. 202011134202.7, Issue Date: Mar. 23, 2022, 2 pages.

* cited by examiner

*Primary Examiner* — Randy P Gulakowski
*Assistant Examiner* — Holley Grace Hester
(74) *Attorney, Agent, or Firm* — HSML P.C.

(57) ABSTRACT

A suspension stabilizer with high yield value and high transparency and a preparation process and use thereof, which relate to the field of suspension stabilizers. The suspension stabilizer includes the following components by mass fraction: water-soluble monomer 5.5%-70.5%; oil-soluble monomer 10.4%-83.1%; monomer with multiple active groups 0-18.7%; functional monomer 0-5.2%; graft-modified monomer 0-15.0%; emulsifier 0.5%-7.0%; and initiator 0.01-2.0%; wherein, the graft-modified monomer is a hydrophilic monomer and/or a hydrophilic group graft-modified monomer.

7 Claims, No Drawings

SUSPENSION STABILIZER WITH HIGH YIELD VALUE AND HIGH TRANSPARENCY, AND PREPARATION PROCESS AND USE THEREOF

CROSS-REFERENCE TO RELATED APPLICATIONS

This application is a national stage for International Application PCT/CN2021/078016, filed on Feb. 26, 2021, and entitled "SUSPENSION STABILIZER WITH HIGH YIELD VALUE AND HIGH TRANSPARENCY, AND PREPARATION PROCESS AND USE THEREOF", which claims the priority benefit of Chinese Patent Application No. 202011134202.7 filed on Oct. 21, 2020.

TECHNICAL FIELD

The present disclosure relates to the field of suspension stabilizers, and in particular relates to a suspension stabilizer with high yield value and high transparency, and a preparation process and use thereof.

BACKGROUND

Suspension stabilizer is a substance that keeps oily ingredients with large particle size and high density in a formulation in a stable state of suspension, which has a dense network structure and a high yield value, and can hold substances that are not easily stable, so as to prevent them from sinking quickly, thus maintaining the stability of the overall formulation.

With the improvement of people's living standards, they gradually like to use products with gorgeous appearance added with natural plants. Therefore, formulators will add natural petals, oily ingredients, exfoliating particles, walnut particles, microcapsules and other ingredients to personal care products and home care products such as shampoo, shower gel, skin care products (creams, masks, etc.). These ingredients are generally not evenly distributed in the formulation and will sink or float; after adding a traditional suspension stabilizer, their viscosity will increase, and the more the suspension stabilizer is added, the higher the viscosity, resulting in poor product experience and turbid appearance, which will affect the appearance. The level of viscosity does not represent the quality of the suspension effect of natural particles, but the level of the yield value of the suspension stabilizer determines the suspension ability. Therefore, study on a suspension stabilizer with high yield value and high transparency has broad market application prospects.

SUMMARY

In order to overcome the deficiencies in the prior art, the first object of the present disclosure is to provide a suspension stabilizer with high yield value and high transparency. The suspension stabilizer with high yield value allow a solution containing the polymer to have a good suspension stabilization effect on some raw materials with large particle size and high density. In addition, the polymer has good transparency after neutralization, and it is suitable for use in products with high transparency.

The second object of the present disclosure is to provide a preparation process of the suspension stabilizer with high yield value and high transparency, so as to allow the molecular structure of the suspension stabilizer to have both high degree of cross-linking and good hydrophilicity, and the suspension stabilizer thus to have high yield value and high transparency.

The third object of the present disclosure is to provide a use of the suspension stabilizer with high yield value and high transparency. In the field of personal care products, the product with high yield value (high suspension stabilization effect) and high transparency is suitable for the suspension of all kinds of petals and particles (such as exfoliating particles and walnut particles, etc.) in transparent shampoo and transparent shower gel, etc., as well as the suspension of various oily ingredients and high-density ingredients in other types of personal care products. In home care products, it is used to suspend ingredients such as microcapsules. And in other fields, it plays a role of suspension stabilization.

The objects of the present disclosure are realized by the following technical solutions.

A suspension stabilizer with high yield value and high transparency including the following components by mass fraction:

| | |
|---|---|
| water-soluble monomer | 5.5%-70.5%; |
| oil-soluble monomer | 10.4%-83.1%; |
| monomer with multiple active groups | 0-18.7%; |
| functional monomer | 0-5.2%; |
| graft-modified monomer | 0-15.0%; |
| emulsifier | 0.5%-7.0%; and |
| initiator | 0.01-2.0%; | wherein, the graft-modified monomer is a hydrophilic monomer and/or a hydrophilic group graft-modified monomer.

In an embodiment, the water-soluble monomer is a composition of one or more of acrylamide, maleic acid (maleic anhydride), itaconic acid, acrylic acid, methacrylic acid or vinylpyrrolidone.

In an embodiment, the oil-soluble monomer is a composition of one or more of styrene, monobutyl itaconate, vinyl acetate, methyl (meth)acrylate, ethyl (meth)acrylate, butyl (meth)acrylate, isopropyl (meth)acrylate, isooctyl (meth)acrylate, hydroxyethyl (meth)acrylate, or hydroxypropyl (meth)acrylate.

In an embodiment, the monomer with multiple active groups is a monomer containing two or more double bonds; and the monomer with multiple active groups is a composition of one or more of N,N'-methylenebisacrylamide, ethylene glycol bis(meth)acrylate, polyethylene glycol bis(meth)acrylate, triethylene glycol di(meth)acrylate, 1,3-butanediol di(meth)acrylate or diallyl phthalate.

In an embodiment, the functional monomer is a fatty acid long-chain monomer and/or a long-chain monomer containing polyether bond; and the functional monomer is a composition of one or more of C10-C30 alkyl polyoxyethylene ether acrylate, C10-C30 alkyl polyoxyethylene ether methacrylate, C10-C30 alkyl phenyl polyoxyethylene ether crotonate, or triphenyl ethyl phenoxy polyoxyethylene ether methacrylate.

In an embodiment, the graft-modified monomer is a composition of one or more of acrylic acid, methacrylic acid, acrylamide, methacrylamide, or N,N'-methylenebisacrylamide.

In an embodiment, the emulsifier is a nonionic emulsifier and/or an anionic emulsifier;

the nonionic emulsifier is a composition of one or more of Span, Tween, alkylphenol polyoxyethylene ether, isomeric alcohol polyoxyethylene ether, or fatty alcohol polyoxyethylene ether;

the anionic emulsifier is a composition of one or more of sodium dodecylbenzenesulfonate, sodium dodecyl sulfate, sodium laureth sulfate (AES-Na), or ammonium laureth sulfate;

the initiator is selected from the group consisting of an inorganic peroxide, an organic peroxide, an azo initiator and a redox initiator;

the inorganic peroxide is ammonium persulfate or potassium persulfate;

the organic peroxide is benzoyl peroxide or tert-butyl hydroperoxide;

the azo initiator is azobisisobutyronitrile or azobisisoheptanenitrile; and the redox initiator is a composition of one or more of ammonium persulfate, potassium persulfate, sodium sulfite or sodium bisulfite.

In an embodiment, the suspension stabilizer with high yield value and high transparency includes the following components by mass fraction:

| | |
|---|---|
| acrylic acid | 40%-65%; |
| ethyl acrylate | 10%-35%; |
| isooctyl acrylate | 10%-25%; |
| C10-C30 alkyl polyoxyethylene ether acrylate | 0-5.2%; |
| diallyl phthalate | 0.1%-10%; |
| methacrylic acid | 0.1%-10.0%; |
| sodium laureth sulfate | 0.05%-5.0%; |
| alkylphenol polyoxyethylene ether | 0.5%-5.0%; and |
| potassium persulfate | 0.01% -2.0%. |

A preparation process of a suspension stabilizer with high yield value and high transparency for preparing the suspension stabilizer with high yield value and high transparency as described above, including the following steps:

step S1 of preparing an emulsified monomer: adding an appropriate amount of deionized water and a formulation amount of a water-soluble monomer, an oil-soluble monomer, a monomer with multiple active groups, a functional monomer and a portion of an emulsifier into an emulsification tank, stirring and emulsifying to obtain a monomer emulsion for later use;

step S2 of preparing an initiator solution: dissolving an initiator in deionized water with a mass ratio of 5%-30%, stirring evenly to obtain an initiator solution for later use;

step S3 of performing a polymerization reaction: adding an appropriate amount of deionized water and the remaining emulsifier into a reaction still, stirring, and adding 0.7%-10.2% of the monomer emulsion, heating up to 60° C. to 100° C., and adding dropwise the initiator solution to carry out a seed emulsion polymerization, then adding the remaining monomer emulsion to carry out a polymerization reaction, and then keeping the temperature for 1 h to 2 h to obtain a polymerization solution;

step S4 of performing a graft modification: adding dropwise a graft-modified monomer solution into the polymerization solution within 20 min to 40 min for modification, after addition, keeping the temperature for 0.5 h to 1.5 h to obtain a suspension stabilizer; and step S5 of discharging: cooling the suspension stabilizer to 30° C. to b0° C., then discharging.

A use of the suspension stabilizer with high yield value and high transparency in personal care products, home care products and in other fields where suspension stabilization is required.

Compared with the prior art, the present disclosure has the following beneficial effects:

The suspension stabilizer of the present disclosure has high yield value, which allows the solution containing the suspension stabilizer to have a good suspension stabilization effect on some raw materials with large particle size and high density. In addition, the polymer has good transparency after neutralization, and it is suitable for use in products with high transparency.

In the preparation process of the suspension stabilizer, the synthesis is performed by an emulsion polymerization in which a seed emulsion polymerization is carried out in the early stage, and then a cross-linking polymerization, and finally a graft modification is performed. Since hydrophilic groups, hydrophobic groups and cross-linking groups are included in the molecular structure, it ensures that the molecular structure has both a high degree of cross-linking and good hydrophilicity. As a result, the product has a high yield value and high transparency.

The product has high yield value (high suspension stabilization effect) and high transparency, and is suitable for the suspension of various petals and particles (such as exfoliating particles, walnut particles) in transparent shampoo and transparent shower gel. And the product may also be added into other types of personal care and home care products to suspend ingredients that are not easily stabilized, such as oily ingredients. Compared with the existing suspension stabilizers of the same type on the market, the yield value of the product of the present disclosure is 1 to 5 times that of the similar product on the market. Thus, in the same formulation, in order to achieve the same suspension effect, the amount of the suspension stabilizer may be reduced by 20%-50%. In addition, the product of the present disclosure is used in a formulation of surfactants to prepare a transparent product, and the transparent product can achieve a light transmittance of more than 97%, which is basically completely transparent. Under the condition of high transparency, the color effect of suspended materials (petals, exfoliating particles) can be better reflected, and the sensory effect of the product can be improved.

DETAILED DESCRIPTION OF THE EMBODIMENTS

The present disclosure will be further described below with reference to specific embodiments. It should be noted that, under the premise of no conflict, each embodiment or each technical feature described below may be arbitrarily combined to form new embodiments.

A suspension stabilizer with high yield value and high transparency includes the following components by mass fraction:

| | |
|---|---|
| water-soluble monomer | 5.5%-70.5%, |
| oil-soluble monomer | 10.4%-83.1% |
| monomer with multiple active groups | 0-18.7%; |
| functional monomer | 0-5.2%, |
| graft-modified monomer | 0-15.0%; |
| emulsifier | 0.5%-7.0%; and |
| initiator | 0.01-2.0%; | wherein, the graft-modified monomer is a hydrophilic monomer and/or a hydrophilic group graft-modified monomer.

The suspension stabilizer of the present disclosure has high yield value, which allows the solution containing the suspension stabilizer to have a good suspension stabilization effect on some raw materials with large particle size and high density. In addition, the polymer has good transparency after neutralization, and it is suitable for use in products with high transparency. It is safe and non-irritating, and is suitable for use in personal care products.

In an embodiment, the water-soluble monomer is a composition of one or more of acrylamide, maleic acid (maleic anhydride), itaconic acid, acrylic acid, methacrylic acid or vinylpyrrolidone.

In an embodiment, the oil-soluble monomer is a composition of one or more of styrene, monobutyl itaconate, vinyl acetate, methyl (meth) acrylate, ethyl (meth)acrylate, butyl (meth)acrylate, isopropyl (meth)acrylate, isooctyl (meth) acrylate, hydroxyethyl (meth)acrylate, or hydroxypropyl (meth)acrylate.

In an embodiment, the monomer with multiple active groups is a monomer containing two or more double bonds. Preferably, the monomer with multiple active groups is a composition of one or more of acrylic acid, methacrylic acid, N,N'-methylenebisacrylamide, ethylene glycol bis (meth)acrylate, polyethylene glycol bis(meth)acrylate, triethylene glycol di(meth)acrylate, 1,3-butanediol di(meth) acrylate or diallyl phthalate.

The monomer with multiple active groups is a monomer containing two or more double bonds, and the monomer with multiple active groups has unsaturation, which can strengthen the polymerization reaction and improve the cross-linking degree of the molecular structure.

In an embodiment, the functional monomer is a fatty acid long-chain monomer and/or a long-chain monomer containing polyether bond. Preferably, the functional monomer is a composition of one or more of C10-C30 alkyl polyoxyethylene ether acrylate, C10-C30 alkyl polyoxyethylene ether methacrylate, C10-C30 alkyl phenyl polyoxyethylene ether crotonate, or triphenyl ethyl phenoxy polyoxyethylene ether methacrylate.

The functional monomer has an obvious effect on the stability and rheology of the suspension stabilizer. Inventors have found that a long-chain alkyl group with a carbon chain up to 10 to 30 is introduced in such functional monomer, and since the long-chain alkyl group has strong steric hindrance capability, when macromolecular chains such as acrylate are swollen and unfolded, it may provide different thixotropy due to its steric hindrance, and improve the yield value of the suspension stabilizer.

In an embodiment, the graft-modified monomer is a composition of one or more of acrylic acid, methacrylic acid, acrylamide, methacrylamide, or N,N'-methylenebisacrylamide.

In an embodiment, the emulsifier is a nonionic emulsifier and/or an anionic emulsifier;

the nonionic emulsifier is a composition of one or more of Span, Tween, alkylphenol polyoxyethylene ether, isomeric alcohol polyoxyethylene ether, or fatty alcohol polyoxyethylene ether;

the anionic emulsifier is a composition of one or more of sodium dodecylbenzenesulfonate, sodium dodecyl sulfate, sodium laureth sulfate, or ammonium laureth sulfate.

The nonionic surfactant has high surface activity, good solubilization, washing and antistatic property, lime soap dispersion, less irritation, and excellent wetting and washing functions. The applicable pH value range is wider than general ionic surfactants, and it may also be used together with other ionic surfactants. Adding a small amount of the nonionic surfactant into the ionic surfactant may improve the surface activity of the system.

In an embodiment, the initiator is selected from the group consisting of an inorganic peroxide, an organic peroxide, an azo initiator and a redox initiator;

the inorganic peroxide is ammonium persulfate or potassium persulfate;

the organic peroxide is benzoyl peroxide or tert-butyl hydroperoxide;

the azo initiator is azobisisobutyronitrile or azobisisoheptanenitrile; and the redox initiator is a combination of one or more of ammonium persulfate, potassium persulfate, sodium sulfite or sodium bisulfite.

In an embodiment, the suspension stabilizer with high yield value and high transparency includes the following components by mass fraction:

| | |
|---|---|
| acrylic acid | 40%-65%, |
| ethyl acrylate | 10%-35%; |
| isooctyl acrylate | 10%-25%; |
| C10-C30 alkyl polyoxyethylene ether acrylate | 0-5.2%; |
| diallyl phthalate | 0.1%-10%; |
| methacrylic acid | 0.1%-10.0%; |
| sodium laureth sulfate | 0.05%-5.0%; |
| alkylphenol polyoxyethylene ether | 0.5%-5.0%; and |
| potassium persulfate | 0.01% -2.0%. |

The preparation process of the suspension stabilizer with high yield value and high transparency includes the following steps:

Step S1 of preparing an emulsified monomer: adding an appropriate amount of deionized water and a formulation amount of a water-soluble monomer, an oil-soluble monomer, a monomer with multiple active groups, a functional monomer and a portion of an emulsifier into an emulsification tank, stirring and emulsifying to obtain a monomer emulsion for later use;

Step S2 of preparing an initiator solution: dissolving an initiator in deionized water with a mass ratio of 5%-30%, stirring evenly to obtain an initiator solution for later use;

Step S3 of performing a polymerization reaction: adding an appropriate amount of deionized water and the remaining emulsifier into a reaction still, stirring, and adding 0.7%-10.2% of the monomer emulsion, heating up to 60° C. to 100° C., and adding dropwise the initiator solution to carry out a seed emulsion polymerization, then adding the remaining monomer emulsion to carry out a polymerization reaction, and then keeping the temperature for 1 h to 2 h to obtain a polymerization solution;

Step S4 of performing a graft modification: adding dropwise a graft-modified monomer solution into the polymerization solution within 20 min to 40 min for modification, after addition, keeping the temperature for 0.5 h to 1.5 h to obtain a suspension stabilizer; and Step S5 of discharging: cooling the suspension stabilizer to 30° C. to 60° C., then discharging.

In the preparation process of the suspension stabilizer, the synthesis is performed by an emulsion polymerization in which a seed emulsion polymerization is carried out in the early stage, and then a cross-linking polymerization, and finally a graft modification is performed. Since hydrophilic groups, hydrophobic groups and cross-linking groups are included in the molecular structure, it ensures that the molecular structure has both a high degree of cross-linking and good hydrophilicity. As a result, the product has a high yield value and high transparency.

EXAMPLE 1

A suspension stabilizer with high yield value and high transparency includes the following components by mass fraction:

| | |
|---|---|
| acrylic acid | 171 8; |
| ethyl acrylate | 105 g; |
| isooctyl acrylate | 49 g; |
| diallyl phthalate | 2.2g; |
| acrylamide | 3.5g; |
| AES-Na (sodium laureth sulfate) | 3.1g, |
| TX-10 (alkylphenol polyoxyethylene ether) | 2.4g;and |
| potassium persulfate | 0.4g. |

The preparation process of the suspension stabilizer was as follows:

In step (1), 423 g of deionized water was added into a 1 L flask with stirring rod, 1.7 g of TX-10 and 2.2 g of AES-Na were added at the same time, and the mixture was fully stirred at a speed of 400 rpm to 600 rpm, then 171 g of acrylic acid, 105 g of ethyl acrylate, 49 g of isooctyl acrylate and 2.2 g of diallyl phthalate were added and then kept stirring at high speed to prepare an emulsion for later use.

In step (2), 0.4 g of potassium persulfate was added into 100 g of deionized water, and dissolved evenly to prepare an aqueous initiator solution.

In step (3), 244 g of deionized water, 0.7 g of TX-10 and 0.9 g of AES-Na were added into another four-necked flask, and the mixture was stirred at 400 rpm to 600 rpm. After 10 minutes, 40 g of the emulsion obtained in the step (1) was added, and the temperature was slowly raised at the same time, and the speed was adjusted to 20 rpm to 40 rpm. When the temperature was raised to 75° C., the aqueous initiator solution was added dropwise, and the emulsion was added dropwise after 60 minutes, then the temperature was kept for 1.5 h after the addition of the emulsion and the aqueous initiator solution.

In step (4), after the addition of the emulsion, 3.5 g of acrylamide was dissolved in 20 g of deionized water and added into the emulsion flask.

In step (5), when the timing of the step (3) was over, the aqueous solution obtained in the step (4) was slowly added dropwise and the addition was controlled to be completed within 20 min to 40 min. After the addition, 1 h of timing was performed.

In step (6), when the timing was over, the temperature was lowered to below 60° C., and the product was discharged.

Conventional detection indexes of the product of this embodiment are as follows:

Appearance: milky white liquid;
Odor: light characteristic odor;
PH: 5.74;
Solid content: 30.14%.

The product may be used in personal care products to stabilize oily ingredients in formulations. Compared with the existing suspension stabilizers of the same type on the market, the yield value of the product of the present disclosure was 2 to 5 times that of the similar product on the market. Thus, in the same formulation, in order to achieve the same suspension effect, the amount of the suspension stabilizer may be reduced by 20%-50%.

EXAMPLE 2

A suspension stabilizer with high yield value and high transparency includes the following components by mass fraction:

| | |
|---|---|
| acrylic acid | 171 g. |
| ethyl acrylate | 105 g; |

-continued

| | |
|---|---|
| isooctyl acrylate | 49 g; |
| diallyl phthalate | 2.2 g; |
| C10-C30 alkyl polyoxyethylene ether acrylate | 1.07g; |
| methacrylic acid | 3.5 g; |
| AES-Na | 3.1 g; |
| TX-10 | 2.4 g;and |
| potassium persulfate | 0.4g. |

The preparation process of the suspension stabilizer was as follows:

In step (1), 423 g of deionized water was added into a 1 L flask with stirring rod, 1.7 g of TX-10, and 2.2 g of AES-Na were added at the same time, and the mixture was fully stirred at a speed of 400 rpm to 600 rpm, then 171 g of acrylic acid, 105 g of ethyl acrylate, 49 g of isooctyl acrylate, 2.2 g of diallyl phthalate and 1.07 g of C10-C30 alkyl polyoxyethylene ether acrylate were added and then kept stirring at high speed to prepare an emulsion for later use.

In step (2), 0.4 g of potassium persulfate was added into 100 g of deionized water, and dissolved evenly to prepare an aqueous initiator solution.

In step (3), 244 g of deionized water, 0.7 g of TX-10 and 0.9 g of AES-Na were added into another four-necked flask, and the mixture was stirred at 400 rpm to 600 rpm. After 10 minutes, 40 g of the emulsion obtained in the step (1) was added, and the temperature was slowly raised at the same time, and the speed was adjusted to 20 rpm to 40 rpm. When the temperature was raised to 75° C., the aqueous initiator solution was added dropwise, and the emulsion was added dropwise after 60 minutes, then the temperature was kept for 1.5 h after the addition of the emulsion and the aqueous initiator solution.

In step (4), after the addition of the emulsion, 3.5 g of methacrylic acid was dissolved in 20 g of deionized water and added into the emulsion flask.

In step (5), when the timing of the step (3) was over, the aqueous solution obtained in the step (4) was slowly added dropwise and the addition was controlled to be completed within 20 min to 40 min. After the addition, 1 h of timing was performed.

In step (6), when the timing was over, the temperature was lowered to below 60° C., and the product was discharged.

Conventional detection indexes of the product of this embodiment are as follows:

Appearance: milky white liquid;
Odor: light characteristic odor;
PH: 5.85;
Solid content: 30.6%.

The product may be used in home care products to stabilize oily ingredients (such as, microcapsules, etc.) in formulations. Compared with the existing suspension stabilizers of the same type on the market, the yield value of the product of the present disclosure was 2 to 5 times that of the similar product on the market. Thus, in the same formulation, in order to achieve the same suspension effect, the amount of the suspension stabilizer may be reduced by 20%-50%.

EXAMPLE 3

A suspension stabilizer with high yield value and high transparency includes the following components by mass fraction:

| | |
|---|---|
| methacrylic acid | 177 g; |
| ethyl acrylate | 120 g; |
| N,N'-methylenebisacrylamide | 4.4 g; |
| C10-C30 alkyl polyoxyethylene ether acrylate | 3.55 g; |
| acrylic acid | 6.7 g; |
| Tween-80 | 5.8 g; |
| sodium dodecylbenzenesulfonate | 2.01 g; and |
| ammonium persulfate | 0.5 g. |

The preparation process of the suspension stabilizer was as follows:

In step (1), 425 g of deionized water was added into a 1 L flask with stirring rod, 1.0 g of sodium dodecylbenzenesulfonate, and 3.4 g of Tween-80 were added at the same time, and the mixture was fully stirred at a speed of 400 rpm to 600 rpm, then 177 g of methacrylic acid, 120 g of ethyl acrylate, 4.4 g of N,N'-methylenebisacrylamide, 3.55 g of C10-C30 alkyl polyoxyethylene ether acrylate were added and then kept stirring at high speed to prepare an emulsion for later use.

In step (2), 0.5 g of ammonium persulfate was added into 100 g of deionized water, and dissolved evenly to prepare an aqueous initiator solution.

In step (3), 240 g of deionized water, 1.01 g of sodium dodecylbenzenesulfonate and 2.4 g of Tween-80 were added into another four-necked flask, and the mixture was stirred at 400 rpm to 600 rpm. After 10 minutes, 40 g of the emulsion obtained in the step (1) was added, and the temperature was slowly raised at the same time, and the speed was adjusted to 20 rpm to 40 rpm. When the temperature was raised to 75° C., the aqueous initiator solution was added dropwise, and the emulsion was added dropwise after 60 minutes, then the temperature was kept for 1.5 h after the addition of the emulsion and the aqueous initiator solution.

In step (4), after the addition of the emulsion was added dropwise, 6.7 g of acrylic acid was dissolved in 20 g of deionized water and added into the emulsion flask.

In step (5), when the timing of the step (3) was over, the aqueous solution obtained in the step (4) was slowly added dropwise and the addition was controlled to be completed within 20 min to 40 min. After the addition, 1 h of timing was performed.

In step (6), when the timing was over, the temperature was lowered to below 60° C., and the product was discharged.

Conventional detection indexes of the product of this embodiment are as follows:

Appearance: milky white liquid;
Odor: light characteristic odor;
PH: 1.98;
Solid content: 30.79%.

In these Examples, the synthesis was performed by an emulsion polymerization in which a seed emulsion polymerization was carried out in the early stage, and then a cross-linking polymerization, and finally a graft modification was performed. Since hydrophilic groups, hydrophobic groups and cross-linking groups are included in the molecular structure, it ensures that the molecular structure has both a high degree of cross-linking and good hydrophilicity. As a result, the product has a high yield value and high transparency. The functional monomer has an obvious effect on the stability and rheology of the suspension stabilizer. Since the long-chain alkyl group has strong steric hindrance capability, when macromolecular chains such as acrylate are swollen and unfolded, it may provide different thixotropy due to its steric hindrance, and improve the yield value of the suspension stabilizer.

Equipment required for product testing:

1) Viscometer, NDJ-1, Shanghai Jingke;
2) PH meter, LEICI PHS-3C, Shanghai INESA Scientific Instrument Co., Ltd.;
3) UV-Vis spectrophotometer. SP-754, Shanghai Spectrum Instruments Co., Ltd.;
4) Centrifuge, TDL80-2B, Shanghai Anting Scientific Instrument Factory;
5) Blast drying oven, DHG-9075A, Shanghai Yiheng Technology Co., Ltd.;
6) Electronic balance, JJ2000B, Changshu G & G Measurement Plant.

COMPARATIVE EXAMPLE 1

Application formulation of a certain domestic suspended petal shower gel with high transparency:

| Phase | No | Raw material name INCI name | Addition amount (%) |
|---|---|---|---|
| A | 1 | deionized water | Up to 100 |
| | 2 | disodium EDTA | 0.1 |
| | 3 | sodium laureth sulfate | 8.0-15.0 |
| | 4 | ammonium lauryl sulfate | 4.0-5.0 |
| | 5 | sodium lauroyl sarcosine | 5.0-15.0 |
| | 6 | cocamidopropyl betaine | 8.0-15.0 |
| B | 7 | methylchloroisothiazolinone/methylisothiazolinone | 0.05 |
| | 8 | DMDM hydantoin | 0.3 |
| | 9 | essence | 0.3 |
| C | 10 | suspension stabilizer | 4.0-8.0 |
| | 11 | water | 7.0-7.5 |
| D | 12. | sodium hydroxide (20% aqueous solution) | 1.14-1.22 |
| E | 13 | petal | appropriate amount |

Steps of preparing the shower gel include:

1. At room temperature, the components of phase A were added in sequence, and stirred until the material was completely dissolved and there was no lump;

2. The components of phase B were added in sequence and stirred evenly;

3. The mixture of phase C was added and stirred for about 10 min, then phase D was added to adjust pH value to 6.0~7.0; and 4. After adding phase D and stirring evenly, phase E was added and stirred evenly.

Formulation instructions:

When no suspension stabilizer and sodium hydroxide were added in this formulation, the material had almost no viscosity. If petals were added at this time, the petals could not be evenly distributed in the material, and they would sink or float. After adding a suspension stabilizer, the viscosity would increase, and the more the suspension stabilizer was added, the higher the viscosity. However, the level of viscosity did not represent the quality of the suspension effect of petals, while the level of the yield value of the suspension stabilizer determined the suspension ability. Table 1 shows a comparison of the data of Examples 1 to 3 and Comparative Example 1.

TABLE 1

| Suspension stabilizer manufacturer | Amount of suspension stabilizer (%) | Viscosity of shower gel (mPa.s) | Light transmittance of formulation (%, wavelength of 420 nm) | Suspension effect (observed in 48° C. oven) |
|---|---|---|---|---|
| Example 1 | 4 | 387.5 | 95.7 | may be suspended for 4 to 5 days |
|  | 4.5 | 975 | 97.1 | suspended for more than 3 months |
|  | 5 | 1800 | 98.2 | suspended for more than 3 months |
|  | 5.5 | 3000 | 98.1 | suspended for more than 3 months |
| Example 2 | 4 | 390 | 96.3 | may be suspended for 4 to 5 days |
|  | 4.5 | 989 | 97.5 | suspended for more than 3 months |
|  | 5 | 1824 | 98.3 | suspended for more than 3 months |
|  | 5.5 | 3015 | 98.3 | suspended for more than 3 months |
| Example 3 | 4 | 391 | 95.9 | may be suspended for 4 to 5 days |
|  | 4.5 | 988 | 97.3 | suspended for more than 3 months |
|  | 5 | 1820 | 98.4 | suspended for more than 3 months |
|  | 5.5 | 3010 | 98.5 | suspended for more than 3 months |
| Comparative Example 1 | 4.5 | 412.5 | 96.2 | sank to the bottom of the bottle or floated to the surface after 24 hours |
|  | 5 | 687.5 | 96.9 | sank to the bottom of the bottle or floated to the surface after 24 hours |
|  | 5.5 | 1062.5 | 98.5 | sank to the bottom of the bottle or floated to the surface after 24 hours |
|  | 7 | 4765 | 98.0 | petals moved slightly after a week, and some petals sank to the bottom after 15 days |
|  | 8 | 6420 | 97.7 | suspended for more than 3 months |

Remarks: according to experience, if it can be stable for more than three months in a 48° C. oven, it could meet the general requirement of three-year shelf life of cosmetics at room temperature.

As can be seen from Table 1, the products of Examples 1 to 3 had the characteristics of less amount, high yield value and high transparency. When the amount of the suspension stabilizer was no less than 4.5%, the petals could be stably suspended for more than 3 months under the condition of 48° C., which fully met the requirement of product shelf life of more than 3 years at room temperature. And after compounding, the light transmittance of the product could reach more than 95%, which was close to complete transparency. Therefore, the suspension stabilizer synthesized by the technology of the present disclosure could have a good suspension stabilization effect on some raw materials with large particle size and high density. In addition, the polymer had good transparency after neutralization, and was suitable for use in products with high transparency. Although the light transmittance of Comparative Example 1 could reach above 95, when the amount of suspension stabilization was less than 8%, the suspension effect of the stability of the product within the shelf life could not be guaranteed.

Compared with the existing suspension stabilizers of the same type on the market, the yield value of the product of the present disclosure was 1 to 5 times that of the similar product on the market. Thus, in the same formulation, in order to achieve the same suspension effect, the amount of the suspension stabilizer may be reduced by more than 20%-50%. In addition, the product of the present disclosure was used in a formulation of surfactants to prepare a transparent product, and the transparent product can achieve a light transmittance of more than 97%, which was basically completely transparent. Under the condition of high transparency, the color effect of suspended materials (petals, exfoliating particles) can be better reflected, and the sensory effect of the product can be improved.

The above-mentioned embodiments are only preferred embodiments of the present disclosure, and are not intended to limit the protection scope of the present disclosure. Any insubstantial changes and substitutions made by those skilled in the art on the basis of the present disclosure belong to the protection scope of the present disclosure.

What is claimed is:

1. A method of preparing a suspension stabilizer with high yield value and high transparency, wherein, the suspension stabilizer comprises the following components by mass fraction:

| | |
|---|---|
| water-soluble monomer | 5.5%-70.5%; |
| oil-soluble monomer | 10.4%-83.1%; |
| monomer with multiple active groups | 0-18.7%; |
| functional monomer | 0-5.2%; |
| graft-modified monomer | 0-15.0%; |
| emulsifier | 0.5%-7.0%; and |
| initiator | 0.01-2.0%; | wherein the graft-modified monomer comprises one or more of acrylic acid, methacrylic acid, acrylamide, methacrylamide, and N, N'-methylenebisacrylamide, the method comprising:

preparing an emulsified monomer by adding an appropriate amount of deionized water and a formulation amount of the water-soluble monomer, the oil-soluble monomer, the monomer with multiple active groups, the functional monomer and a first portion of the emulsifier into an emulsification tank, followed by stirring and emulsifying to obtain a monomer emulsion;

preparing an initiator solution by dissolving the initiator in deionized water with a mass ratio of 5%-30%, and stirring evenly to obtain an initiator solution;

performing a polymerization reaction by adding an appropriate amount of deionized water and a remaining portion of the emulsifier into a reaction vessel, stirring, adding a first portion of 0.7%-10.2% of the monomer emulsion, and heating to 60° C.-100° C., and adding the initiator solution dropwise to carry out a seed emulsion polymerization, subsequently adding the remaining monomer emulsion to carry out a polymerization reaction, and then maintaining the temperature for 1 h to 2 h to obtain a polymerization solution;

performing a graft modification by adding dropwise a graft-modified monomer solution into the polymerization solution within 20 min to 40 min for modification, and subsequently maintaining the temperature for 0.5 h to 1.5 h to obtain a suspension stabilizer; and discharging by cooling the suspension stabilizer to 30° C. to 60° C., then discharging.

2. The method of claim 1, wherein, the water-soluble monomer comprises one or more of acrylamide, maleic acid, maleic anhydride, itaconic acid, acrylic acid, methacrylic acid and vinylpyrrolidone.

3. The method of claim 1, wherein, the oil-soluble monomer comprises one or more of styrene, monobutyl itaconate, vinyl acetate, methyl (meth) acrylate, ethyl (meth)acrylate, butyl (meth)acrylate, isopropyl (meth)acrylate, isooctyl (meth)acrylate, hydroxyethyl (meth)acrylate, and hydroxypropyl (meth)acrylate.

4. The method of claim 1, wherein, the monomer with multiple active groups is a monomer containing two or more double bonds; and the monomer with multiple active groups comprises one or more of N, N'-methylenebisacrylamide, ethylene glycol bis(meth)acrylate, polyethylene glycol bis(meth)acrylate, triethylene glycol di(meth)acrylate, 1,3-butanediol di(meth)acrylate and diallyl phthalate.

5. The method of claim 1, wherein,
the functional monomer is one or more of a fatty acid long-chain monomer and a long-chain monomer containing polyether bond; and the functional monomer comprises one or more of C10-C30 alkyl polyoxyethylene ether acrylate, C10-C30 alkyl polyoxyethylene ether methacrylate, C10-C30 alkyl phenyl polyoxyethylene ether crotonate, and triphenyl ethyl phenoxy polyoxyethylene ether methacrylate.

6. The method of claim 1, wherein, the emulsifier is one or more of a nonionic emulsifier and an anionic emulsifier; the nonionic emulsifier comprises one or more of sorbitan fatty acid esters, polyoxyethylene sorbitan fatty acid esters, alkylphenol polyoxyethylene ether, isomeric alcohol polyoxyethylene ether, and fatty alcohol polyoxyethylene ether;
the anionic emulsifier comprises one or more of sodium dodecylbenzenesulfonate, sodium dodecyl sulfate, sodium laureth sulfate, and ammonium laureth sulfate;
the initiator is selected from the group consisting of an inorganic peroxide, an organic peroxide, an azo initiator and a redox initiator;
the inorganic peroxide is ammonium persulfate or potassium persulfate;
the organic peroxide is benzoyl peroxide or tert-butyl hydroperoxide;
the azo initiator is azobisisobutyronitrile or azobisisoheptanenitrile; and
the redox initiator comprises one or more of ammonium persulfate, potassium persulfate, sodium sulfite and sodium bisulfite.

7. The method of claim 1, wherein, the suspension stabilizer comprises the following components by mass fraction:

| | |
|---|---|
| acrylic acid | 40%-65%; |
| ethyl acrylate | 10%-35%; |
| isooctyl acrylate | 10%-25%; |
| C10-C30 alkyl polyoxyethylene ether acrylate | 0-5.2%; |
| diallyl phthalate | 0.1%-10%; |
| methacrylic acid | 0.1%-10.0%; |
| sodium laureth sulfate | 0.05%-5.0%; |
| alkylphenol polyoxyethylene ether | 0.5%-5.0%; and |
| potassium persulfate | 0.01%-2.0%. |

* * * * *